Figure 1:
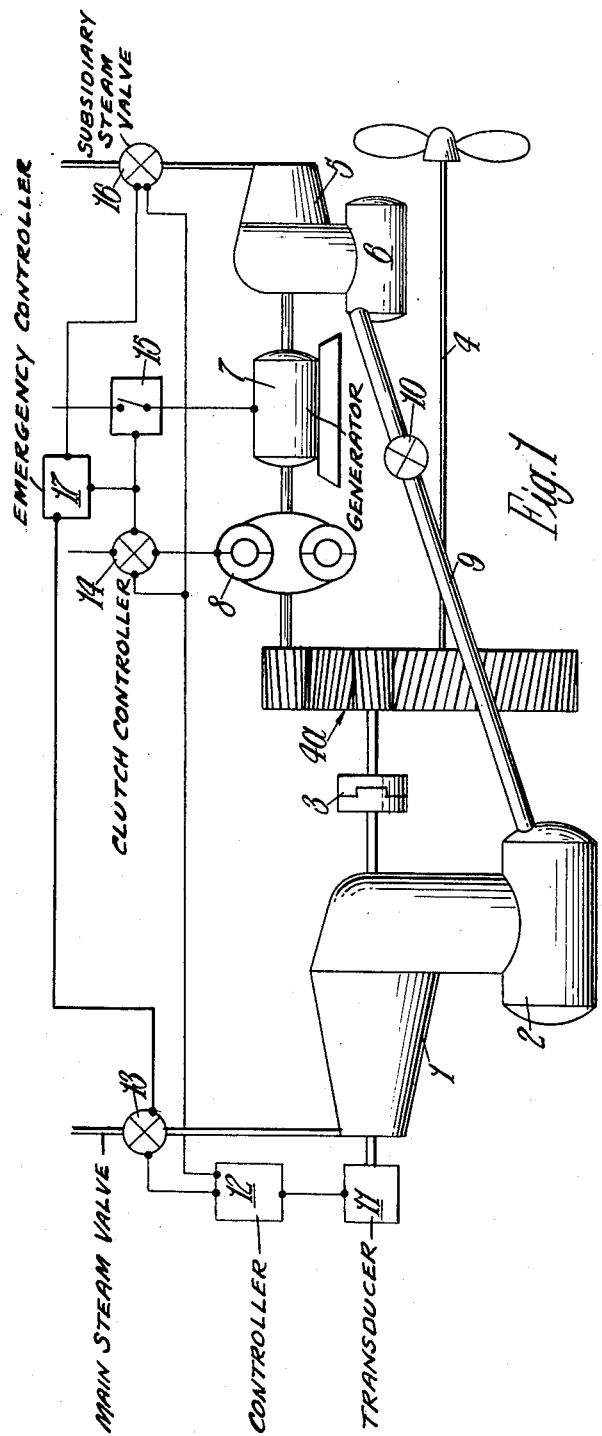

United States Patent Office 3,165,897
Patented Jan. 19, 1965

3,165,897
STEAM TURBINE MACHINERY
Robert Coats, Ponteland, and Michael Leslie Ryall, Whitley Bay, England, assignors to Pametrada, Wallsend, England
Filed Dec. 14, 1962, Ser. No. 244,627
Claims priority, application Great Britain, Dec. 15, 1961, 44,971/61
6 Claims. (Cl. 60—102)

This invention relates to steam turbine machinery and more particularly though not exclusively to steam turbine installations in ships furnished with a single cylinder propulsion turbine.

The main object of the present invention is to provide an alternative more efficient means of generating electrical power in ships having a single cylinder propulsion turbine.

It is well known that a two-cylinder propulsion turbine of small power is more expensive than a single cylinder machine of the same power but the single cylinder machine has the disadvantage that, should the only cylinder fail, there is no alternative means of emergency propulsion available from another cylinder.

Means have been devised in the past for the provision of this emergency power from a small turbine which is only connected to the propeller shaft in the event of breakdown of the propulsion machinery, but a disadvantage of this arrangement is that an emergency machine has to be installed in the ship which is unlikely to run for more than a few hours in the whole life of the ship.

The present invention is intended to fulfil the requirement of an emergency power unit without the requirement of a special emergency turbine, at the same time effecting an improvement in the efficiency of auxiliary electrical power generation.

The present invention consists in a steam turbine installation comprising a condensing main steam turbine and a condensing subsidiary steam turbine, means for connecting the subsidiary turbine to a generator, a coupling for connecting the main steam turbine to a power output shaft and a clutch for connecting the subsidiary turbine to the power output shaft, at least one condenser connected to both turbines, and control means for engaging the clutch and cutting off the steam supply to the subsidiary turbine when the main turbine speed exceeds a predetermined value, and for disengaging the clutch whilst supplying steam to the subsidiary turbine and to the main turbine or alternatively engaging the clutch whilst supplying steam to the subsidiary turbine, cutting off steam to the main turbine and electrically isolating the generator, when the main turbine speed is below said predetermined value.

Each turbine may have a condenser, a closable interconnecting duct being provided between the condensers, the interconnecting duct being of a width adequate for evacuating the subsidiary turbine and its condenser when no steam other than gland sealing steam is being supplied to the subsidiary turbine. In this manner, when no steam is being supplied to the subsidiary turbine, this subsidiary turbine can be kept ready for instant service without for instance having to circulate cooling water through its own condenser and without having to run its own ejector during stand-by periods. If the subsidiary turbine and generator are used without the main turbine being used, the interconnecting duct can be closed in order to save having to keep the main turbine and its condenser evacuated. If on starting up the installation, the main turbine is taken into use before the subsidiary turbine, the interconnecting duct could transiently be used for evacuating the initial air content of the subsidiary turbine.

As an alternative, a common condenser, adequate to deal with the main turbine exhaust, may be connected to both turbines, means being provided for blanking off the main turbine exhaust line to the condenser. As the subsidiary turbine may be running whilst the main turbine is stopped, blanking off the main turbine exhaust line saves keeping the main turbine evacuated, and also permits the main turbine to be repaired.

The coupling for connecting the main turbine to the power output shaft is preferably disconnectable so that the main turbine can be stopped whilst the power output shaft is still driven by the subsidiary turbine.

When the main turbine speed exceeds the predetermined value, the electrical power is thus generated by the generator at the comparatively high efficiency associated with the main turbine, whilst when the main turbine speed falls below this predetermined value, the clutch may be disconnected and the generator and the subsidiary turbine may become a self-contained unit.

In the case of a ship's installation, the main turbine conveniently comprises a single-cylinder condensing steam turbine connected to a propeller shaft by way of a gear box and the subsidiary turbine is preferably capable of being coupled to the propeller shaft by way of a hydraulically-operated or magnetically-operated friction clutch or a hydraulic coupling.

With such an arrangement, when the ship is at sea and the main turbine speed is greater than the predetermined value, the steam can be automatically shut-off from the subsidiary turbine, the generator being driven by the main turbine with electrical power generation at comparatively high efficiency. On the other hand, when in harbour or maneouvring, the clutch can be disconnected and the subsidiary turbine and generator can become a self-contained unit with the turbine driven by its own steam.

In order to cater for "crash stop" conditions, the disengagement of the clutch and admission of steam to the subsidiary turbine may be arranged to be synchronised and to occur automatically while the generator is on load, as soon as the main turbine speed falls below the predetermined value, such that undue variation in the frequency of the electrical power produced does not occur.

In the event of breakdown of the main turbine, the automatic controls of the subsidiary turbine would be by-passed, the clutch engaged, and the generator electrically isolated. The subsidiary turbine would then act as an emergency propulsion turbine, an independent stand-by generator set, usually diesel driven, being used to provide the auxiliary electrical power.

Figure 2:
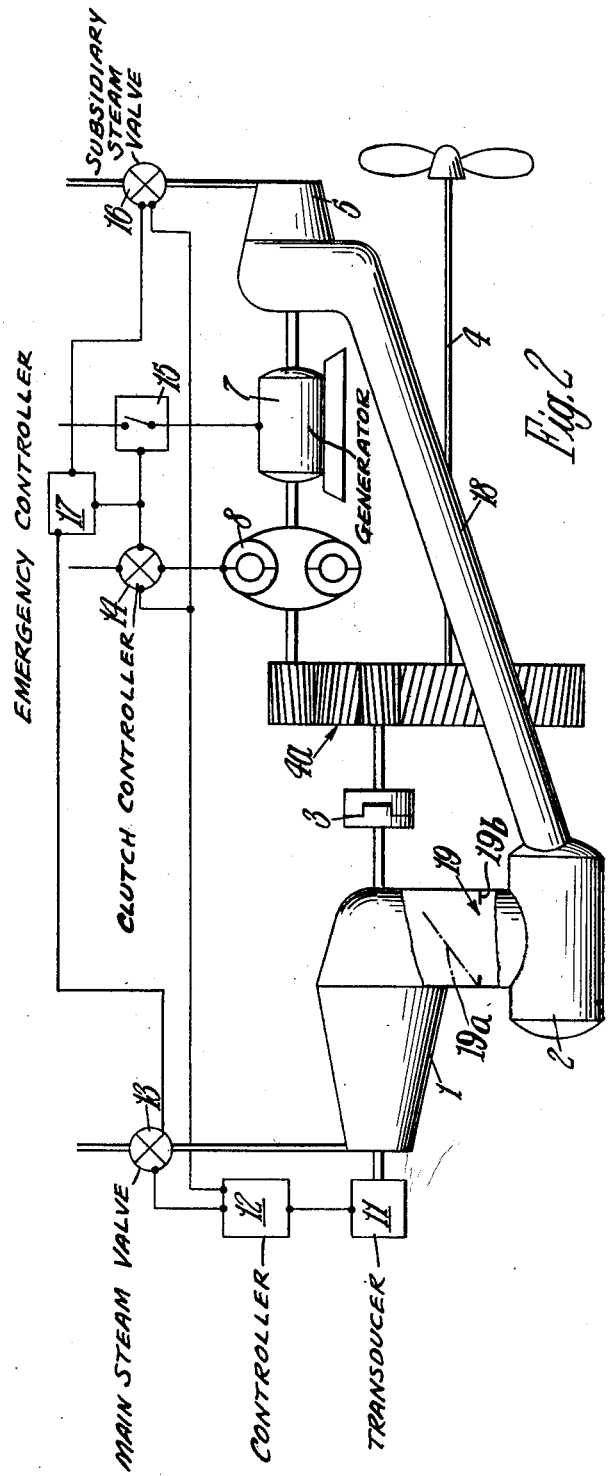

The invention will be further described, by way of example, with reference to the accompanying drawings of which:

FIGURE 1 is a schematic illustration of a first embodiment of a steam turbine installation; and FIGURE 2 is a schematic illustration of a second embodiment of a steam turbine installation.

The installation of FIGURE 1 includes a condensing main steam turbine 1 having a condenser 2 and being connected through a disconnectable coupling 3 and a gear box 4a to a propeller shaft 4. A condensing subsidiary steam turbine 5 having a condenser 6 is coupled to a generator 7, and by way of a clutch 8 and the gear box 4a to the propeller shaft 4. The function of the generator is to generate electrical power in the ship. Such electrical power is used for driving auxiliary machines, inter alia stand-by feed pumps, lubrication pumps and fuel pumps, boiler draught fans, and winches, and to provide energy for lighting, heating, cooking and communications. In the plant illustrated electrical power is not required for propulsion. The condenser 6 is connected to the condenser 2 by a transfer duct 9 having a valve 10, this transfer duct 9 having a width sufficient to evacuate the subsidiary turbine 5.

A speed transducer 11 is coupled to the main turbine 1, this transducer 11 being connected to a controller 12. The controller 12 is connected to a main steam valve 13 controlling the steam supply to the main turbine 1, to a clutch controller 14 controlling the actuation of the clutch 8, to an isolator 15 for electrically isolating the generator 7 and to a subsidiary steam valve 16 controlling the steam supply to the subsidiary turbine 15. An emergency controller 17 is provided, also connected to the valve 13, to the clutch controller 14, to the isolator 15 and to the valve 16.

In normal operation, the coupling 3 will be engaged. When the speed of the steam turbine is above a predetermined value, the controller 12 will be actuated by the transducer 11 to hold the valve 13 open, to engage the clutch 8, to connect the isolator 15 and to close the valve 16; under these conditions, the turbine 5 and the generator 7 will be driven by the main turbine 1, the duct 9 keeping the condenser 6 evacuated and ready for instant service. When the speed of the main turbine 1 is below the predetermined value, the controller 12 will be actuated by the transducer 11 and, according to a presetting of the controller 12, it will either disengage the clutch 8 whilst open the valve 16 or engage the clutch 8 whilst closing the valve 13, opening the valve 16 and actuating the isolator 15 to isolate the generator 7 electrically; under these conditions, the turbine 5 is driven by its own steam supply. When the valve 13 is closed, e.g. during a breakdown of the turbine 1, the coupling 3 can be disconnected and the valve 10 closed to carry out repairs on the turbine 1. When the installation is installed in a ship, the turbine 5 may be used alone, e.g. in harbour, and the valve 10 can also be closed under these circumstances to save keeping the turbine 1 and its condenser 2 evacuated. The controller 17 is for use as a non-automatic, hand controller.

The installation of FIGURE 2 is generally similar to that of FIGURE 1 and the same reference numerals are used for like components. However, the main turbine condenser 2 is connected directly to the vacuum end of the subsidiary turbine 5 by a transfer duct 18 of sufficient width to accommodate the exhaust of the subsidiary turbine 5, the condenser 6 shown in FIGURE 1 being dispensed with. In addition, blanking-off means 19 are provided between the main turbine 1 and its condenser 2 for blanking off the turbine 1 for instance when repairs are to be carried out on turbine 1. Such blanking off means is operator controlled and may comprise a movable lid 19a sealingly co-operable with a flange 19b in the trunking between the turbine and the condenser, and which when not in use is stowed outside or inside the trunking in such a position that it does not significantly interfere with the free flow of exhaust steam. The operation of the second installation is generally similar to that of the first installation, the condenser 2 serving to prime the subsidiary turbine 5 when this turbine 5 is not running, and serving to exhaust the turbine 5 when this turbine 5 is running.

The action of the control means when the main turbine speed falls below the predetermined value can be one of two alternatives, as described above. The alternative which is selected depends on the condition under which the main turbine speed drops. Thus when at sea and underway, whilst not manoeuvring, the main turbine speed would only drop below the predetermined value if the main turbine were to fail, and the control means could be pre-set such that the subsidiary turbine automatically forms an emergency propulsion unit, the generator being electrically isolated and electrical power for auxiliary purposes being generated by an emergency generator. On the other hand, when in harbour or manoeuvring, the presetting can be arranged to select the alternative whereby the subsidiary turbine drives the generator, and the main turbine is responsible solely for propulsion.

We claim:
1. A steam turbine installation comprising a condensing main steam turbine, a steam inlet valve for said main turbine, a condensing subsidiary steam turbine, a steam inlet valve for said subsidiary turbine, an electrical generator drivably connected to said subsidiary turbine, means for switching said generator in or out of service, a power output shaft, a releasable coupling connecting the main turbine to the power output shaft, a clutch arranged to couple the subsidiary turbine and generator to the power output shaft, speed sensitive means coupled to said main turbine, and control means, responsive to said speed sensitive means for controlling the operation of said clutch, switch means and the steam inlet valves, supply to the turbines, said control means maintaining the steam inlet valve for the main turbine in open position, closing the steam inlet valve for the subsidiary turbine, switching the generator into service, and engaging the clutch when the speed of said main turbine exceeds a predetermined limit whereby under high speed operation of the main turbine the generator and the power output shaft are driven by the main turbine, said control means having dual pre-selectable modes of operation when said main turbine speed is below the predetermined speed, one of said pre-selectable modes of operation being to open both steam inlet valves, to disengage the clutch and to switch the generator into service whereby the power output shaft is driven solely by the main turbine and the generator in operation is driven by the subsidiary turbine, and the other of said pre-selectable modes of operation being to close the steam inlet valve to the main turbine, to open the steam inlet valve to the subsidiary turbine, to switch the generator out of service and to engage the said clutch whereby the generator idles and the power output shaft is driven by the subsidiary turbine with the main turbine out of service.

2. A steam turbine installation as claimed in claim 1, comprising two condensers, one condenser being connected to each of the turbines, and a closable duct interconnecting the condensers, said duct being of a width adequate to evacuate the subsidiary turbine and its condenser when no steam other than gland sealing steam is being supplied to the subsidiary turbine.

3. A steam turbine installation as claimed in claim 1, comprising a common condenser for the two turbines adequate to deal with the main turbine exhaust and connected to both turbines, and means for blanking off the main turbine from the condenser.

4. A ship's steam turbine installation comprising a condensing main steam turbine, a steam inlet valve for said main turbine, a condensing subsidiary steam turbine, a steam inlet valve for said subsidiary turbine, an electrical generator drivably connected to said subsidiary turbine, means for switching said generator in or out of service, a propeller shaft, a releasable coupling connecting the main turbine to the propeller shaft, a clutch arranged to couple the subsidiary turbine and generator to the propeller shaft, speed sensitive means coupled to said main turbine, and control means, responsive to said speed sensitive means for controlling the operation of said clutch, switch means and the steam inlet valves, supply to the turbines, said control means maintaining the steam inlet valve for the main turbine in open position, closing the steam inlet valve for the subsidiary turbine, switching the generator into service, and engaging the clutch when the speed of said main turbine exceeds a predetermined limit whereby under high speed operation of the main turbine the generator and the propeller shaft are driven by the main turbine, said control means having dual preselectable modes of operation when said main turbine speed is below the predetermined speed, one of said preselectable modes of operation being to open both steam inlet valves, to disengage the clutch and to switch the generator into service whereby the propeller shaft is driven solely by the main turbine and the generator in operation is driven by the subsidiary turbine, and the other of said pre-selectable modes of operation being to close the steam inlet valve to the main turbine, to open the steam inlet valve to the subsidiary turbine, to switch the generator out of service and to engage the said clutch whereby the generator idles and the propeller shaft is driven by the subsidiary turbine with the main turbine out of service.

5. A ship's steam turbine installation as claimed in claim 2, comprising two condensers, one condenser being connected to each of the turbines, and a closable duct interconnecting the condensers, said duct being of a width adequate to evacuate the subsidiary turbine and its condenser when no steam other than gland sealing steam is being supplied to the subsidiary turbine.

6. A ship's steam turbine installation as claimed in claim 3, comprising a common condenser for the two turbines adequate to deal with the main turbine exhaust and connected to both turbines, and means for blanking off the main turbine from the condenser.

References Cited by the Examiner
UNITED STATES PATENTS

| 1,304,289 | 5/19 | Emmet | 60—102 X |
| 1,573,781 | 2/26 | Kieser | 60—102 X |
| 1,713,649 | 5/29 | Fletcher | 290—4.5 |
| 2,197,651 | 4/40 | Rosch | 60—95 X |
| 2,723,531 | 11/55 | Wosika et al. | 60—102 |

JULIUS E. WEST, *Primary Examiner.*

ROBERT R. BUNEVICH, *Examiner.*